United States Patent
Avlonitis (12) 
(10) Patent No.: US 6,709,284 B1
(45) Date of Patent: Mar. 23, 2004

(54) CONNECTOR MOUNTING WITH PASS-THROUGH SLOT AND DIVERGING ANGLE FACET

(75) Inventor: Artie Avlonitis, San Jose, CA (US)

(73) Assignee: Aurora Networks, Santa Clara, CA (US)

( * ) Notice: Subject to any disclaimer, the term of this patent is extended or adjusted under 35 U.S.C. 154(b) by 0 days.

(21) Appl. No.: 10/109,280

(22) Filed: Mar. 28, 2002

(51) Int. Cl.[7] ............................................... H01R 13/58
(52) U.S. Cl. ........................ 439/457; 439/500; 439/502
(58) Field of Search ................................ 439/457, 500, 439/502; 174/152 G, 65, 35; 269/47

(56) References Cited

U.S. PATENT DOCUMENTS 5,749,737 A * 5/1998 Zuin ........................... 439/500
6,296,240 B1 * 10/2001 Nakai et al. .................. 269/47
6,376,777 B1 * 4/2002 Ito et al. ....................... 174/52

* cited by examiner

*Primary Examiner*—Alexander Gilman
(74) *Attorney, Agent, or Firm*—Gray Cary Ware & Freidenrich, LLP (57) ABSTRACT

Systems and methods are described for a connector mounting. A method includes: providing a connector mounting with a compressive connector bracket and a channel conduit; inserting a connector into the connector mounting via the compressive connector bracket; and resting a connector feed assembly in the channel via a connector feed assembly pass-through slot by penetrating a volume defined by the connector feed assembly pass-through slot with the connector at an angle to a principle plane defined by the connector mounting and then rotating a proximal end of the connector toward the principle plane.

17 Claims, 9 Drawing Sheets

CONNECTOR MOUNTING WITH PASS-THROUGH SLOT AND DIVERGING ANGLE FACET

BACKGROUND OF THE INVENTION

1. Field of the Invention

The invention relates generally to the field of connector mounting. More particularly, the invention relates to optical connector mounting.

2. Discussion of the Related Art

In the early 1980s, a revolution in telecommunication networks began and was spawned by the use of fiber optic technology. Advancements in optical technologies have provided optical networks with increased bandwidth capacity and have allowed network providers to transport large amounts of traffic on fiber infrastructures.

Optical connectors are commonly employed as terminations or couplings in fiber optic links and networks, and often need to be mounted on a surface, such as a printed circuit board (PCB). A large number of optical connectors are available from a variety of manufacturers. However, there are no connector mountings that can accommodate a range of connectors, for use in blind mate situations.

What is required is a solution that can provide optical connector mounting onto a surface and accommodate a wide range of connector specifications, eliminating the need for specialized blind mate connectors. What is also needed is a solution that meets this requirement in a cost-effective manner.

Heretofore, the requirement of providing an optical connector mounting which can accommodate a wide range of optical connector manufacturer specifications in a cost-effective manner has not been fully met. What is needed is a solution that addresses these requirements.

SUMMARY OF THE INVENTION

There is a need for the following embodiments. Of course, the invention is not limited to these embodiments.

According to an aspect of the invention, a method comprises: providing a connector mounting with a compressive connector bracket and a channel; inserting a connector into the connector mounting via the compressive connector bracket; and resting a connector feed assembly in the channel. According to another aspect of the invention, an apparatus comprises a connector mounting including: a compressive connector bracket having a first side wall and an opposing second side wall that is substantially parallel to the first side wall; and a channel coupled to the compressive connector bracket, the channel defining a connector feed assembly pass-through slot that extends along a length of the channel and is substantially parallel to the first side wall.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals designate the same elements. The invention may be better understood by reference to one or more of these drawings in combination with the description presented herein. It should be noted that the features illustrated in the drawings are not necessarily drawn to scale.

FIGS. 5A–5H illustrate orthogonal and perspective views of a parallel mating process utilizing a connector mounting, representing an embodiment of the invention.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In general, the context of the invention can include connector mounting. The context of the invention can include optical, electrical and/or fluidic connector mounting. The context of the invention can also include optical, electrical and/or fluidic connector mounting onto a surface such as, for example, a printed circuit board, module, or the like. The context of the invention can also include deploying optical, electrical, and/or fluidic networks that include the connector mounting.

The invention can provide a method and/or apparatus for mounting standard optical connectors. The invention can provide a connector mounting (holder) used to mount a standard optical connector on a printed circuit board, module, surface, or the like. The connector mounting can accommodate different optical connectors, including: SC (snap connector), FC, ST, LC (Lucent connector), and others. The connector mounting can also accommodate a wide range of optical connector manufacturer specifications, including: Lucent, Senko, Seiko Instruments, AMP/Tyco, Amphenol, Molex, Alcoa Fujikura, and Hirose.

Figure 1A:
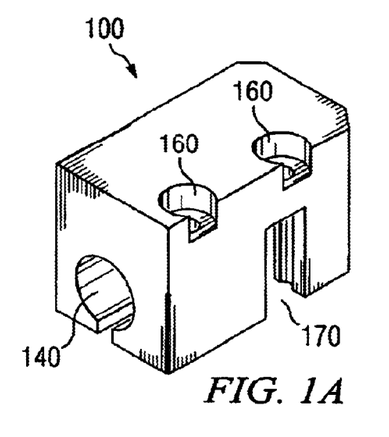
FIGS. 1A–1B illustrate two perspective views of a one-port connector mounting, representing an embodiment of the invention.
Figure 1B:
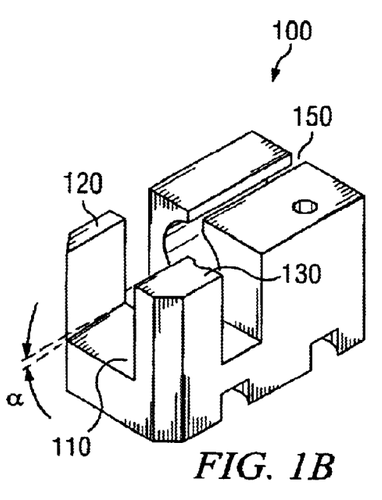

Referring to FIGS. 1A–1B, a perspective view of a one-port connector mounting 100 is depicted. A compressive connector bracket 110 having a first side wall 120 and an opposing second side wall 130 that is substantially parallel to the first side wall 120 is coupled to a channel, in this example a connector feed assembly alignment and stress-relief conduit 140. The side walls can include protrusions near their distal ends (not shown in this embodiment) that extend toward one another to provide a snap-fit function with regard to the connector. A fiber feed assembly pass-through slot 150 extends along a length of the one-port connector mounting 100 and is substantially parallel to the first side wall 120. A pair of coupling passages 160 extends across a height of the one-port connector mounting 100. A transversal slot 170 extends across a width of the one-port connector mounting 100. A facet of the compressive connector bracket located between the first sidewall and the second side wall defines a diverging angle a relative to the length of the channel.

Still referring to FIGS. 1A–1B, each of the pair of coupling passages 160 may include a threaded surface, allowing the one-port connector mounting 100 to be coupled to a surface (such as a printed circuit board) with screws, bolts, or the like. Specific applications may require the use of a single coupling passage, or a plurality of coupling passages. The one-port connector mounting 100 can be constructed with metals, such as, for example, aluminum, plastics, such as, for example, high density polyethylene, or other materials. In a preferred embodiment, the compressive connector bracket 110 and the connector feed assembly alignment and stress-relief conduit 140 are shaped around a standard SC optical connector. The connector feed assembly alignment and stress-relief conduit is an example of what can be generically described as a channel.

Figure 2A:
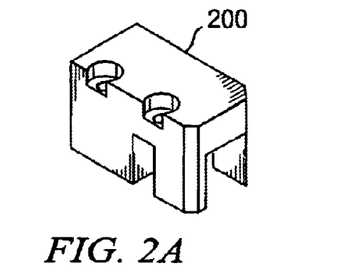
FIGS. 2A–2C illustrate perspective views of a one-port connector mounting, a connector and an assembly, representing an embodiment of the invention.
Figure 2B:
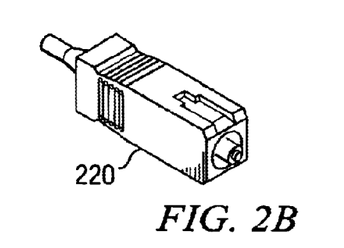
Figure 2C:
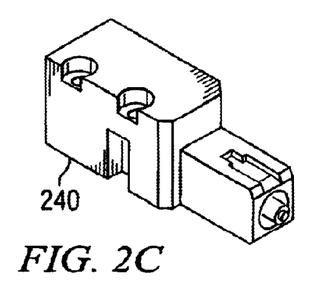
Figure 2D:
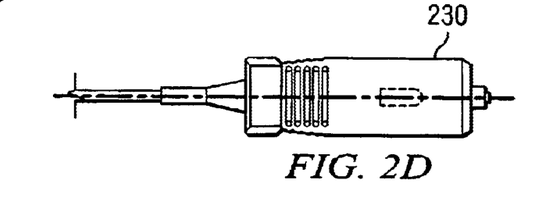
FIGS. 2D–2F illustrate orthogonal views of a connector, a one-port connector mounting and an assembly, representing an embodiment of the invention.
Figure 2E:
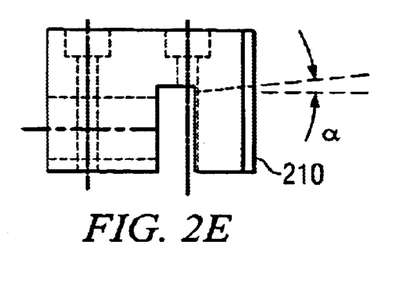
Figure 2F:
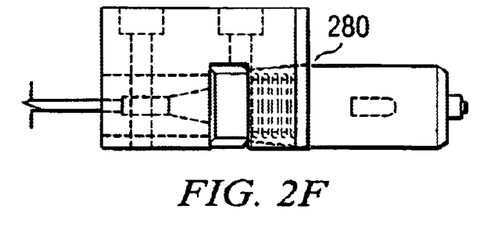
Figure 2G:
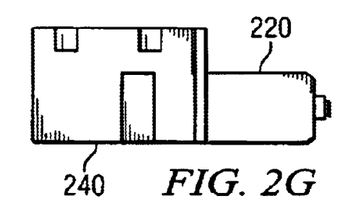
FIGS. 2G–2I illustrate orthogonal views of a one-port connector mounting assembly, representing an embodiment of the invention.
Figure 2H:
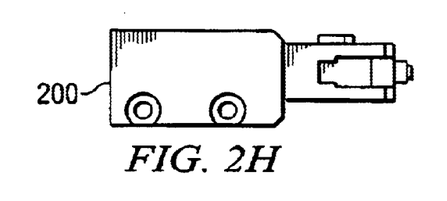
Figure 2I:
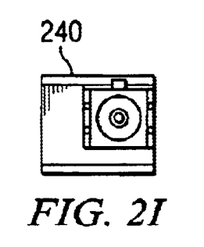

Referring to FIGS. 2A–2I, perspective and orthogonal views of a one-port mounting assembly is depicted. Referring to FIGS. 2A–2C, a mounting assembly 240 is obtained by inserting an optical connector 220 into a one-port mounting 200. Similarly, referring to FIGS. 2D–2F, a mounting assembly 280 is obtained by inserting an optical connector 230 into another one-port mounting 210. FIGS. 2G–2I depict orthogonal views of the components and assembly shown in FIGS. 2A–2C. The mounting assembly may be mounted onto a surface, plate or board. In a preferred embodiment, the optical connector includes a standard SC optical connector.

Figure 3A:
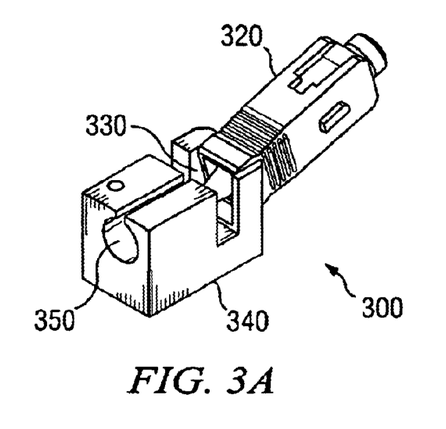
FIGS. 3A–3B illustrates a process of joining a connector and a connector mounting to form a mounting assembly, representing an embodiment of the invention.
Figure 3B:
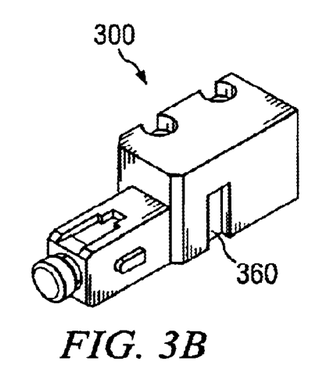
Figure 4A:
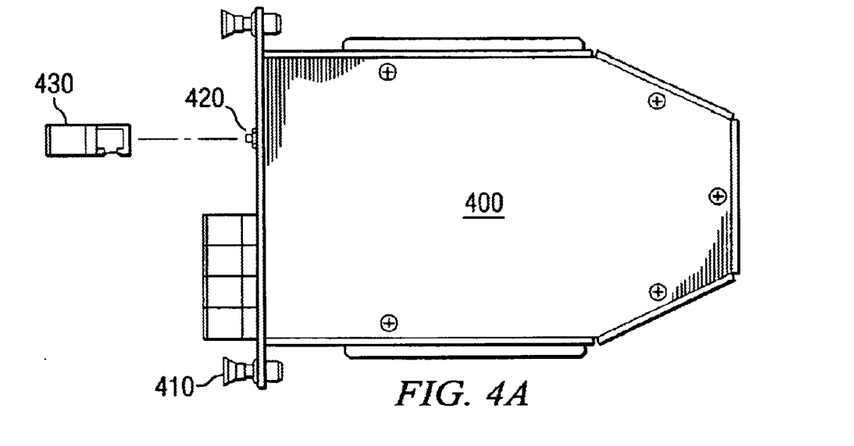
FIGS. 4A–4H illustrate orthogonal and perspective views of a process joining a connector and a multi-port connector mounting, representing an embodiment of the invention.
Figure 4B:
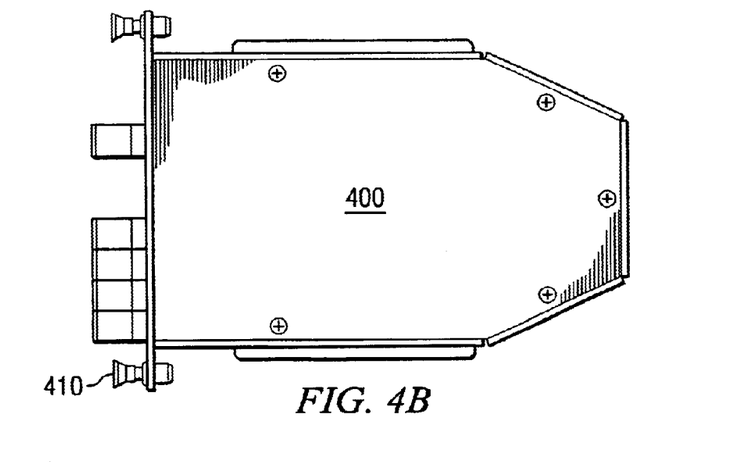
Figure 4C:
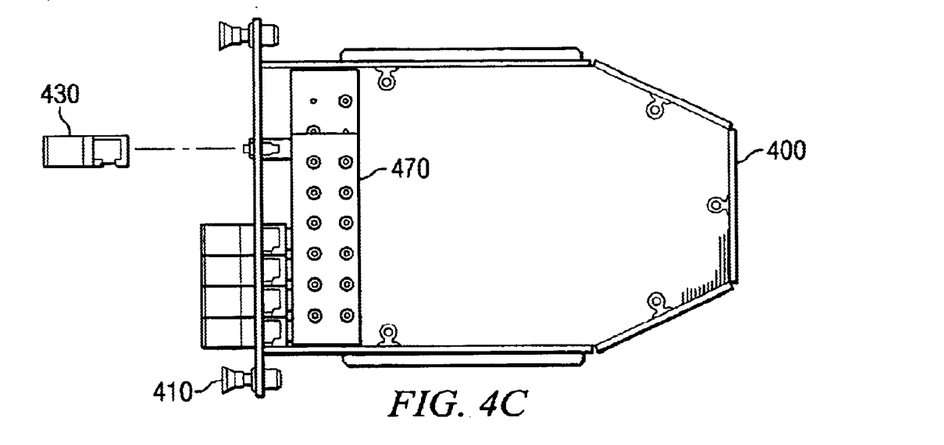
Figure 4D:
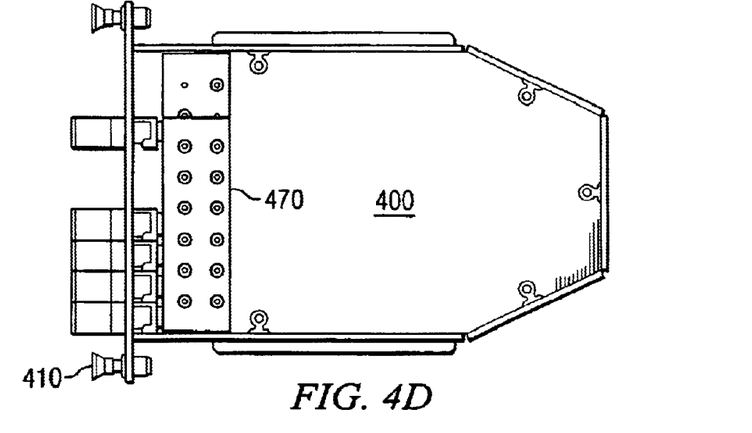
Figure 4E:
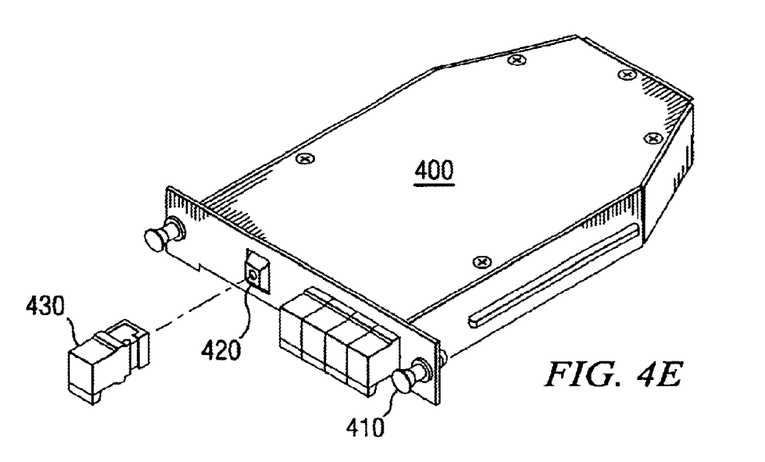
Figure 4F:
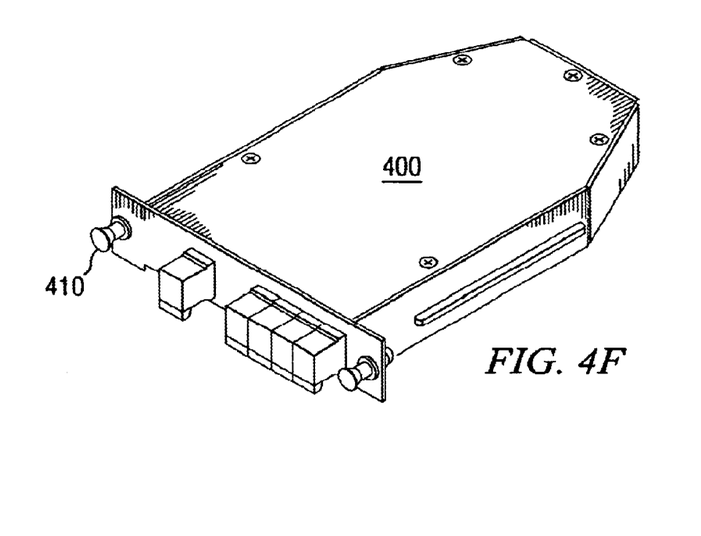
Figure 4G:
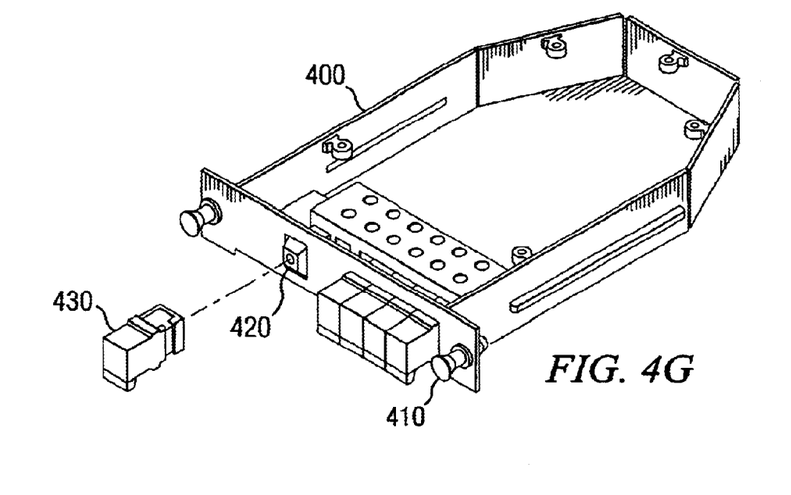
Figure 4H:
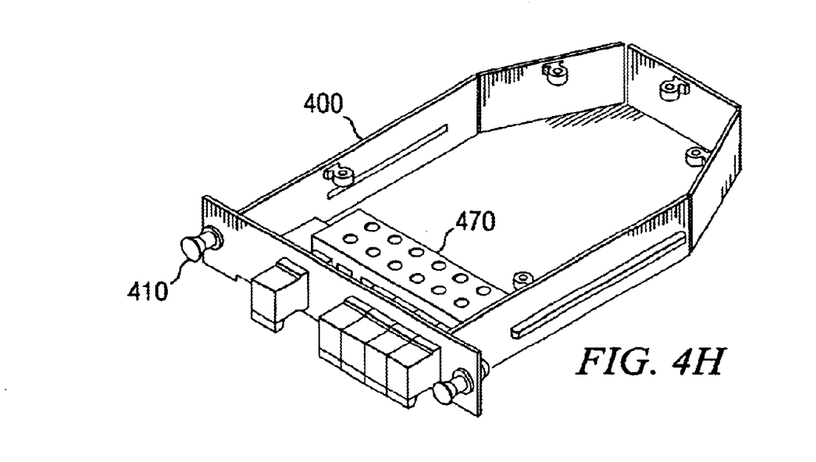
Figure 5A:
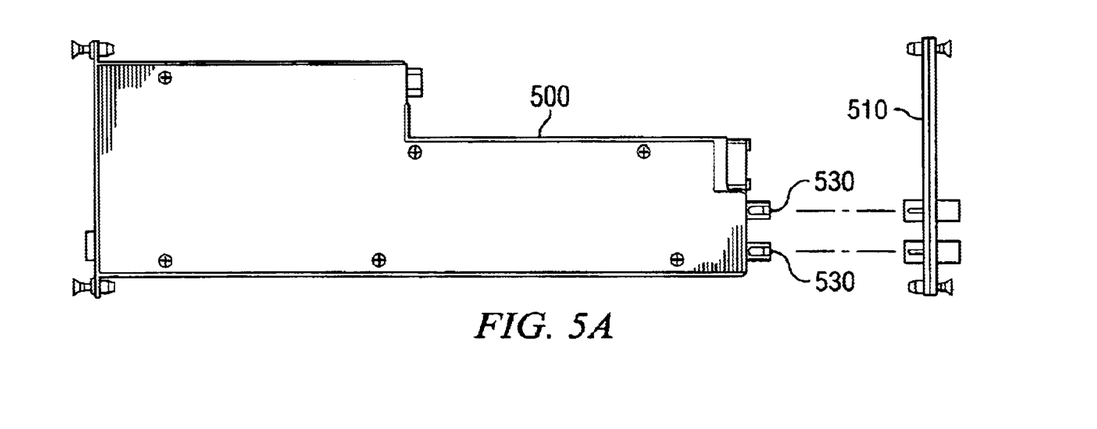
Figure 5B:
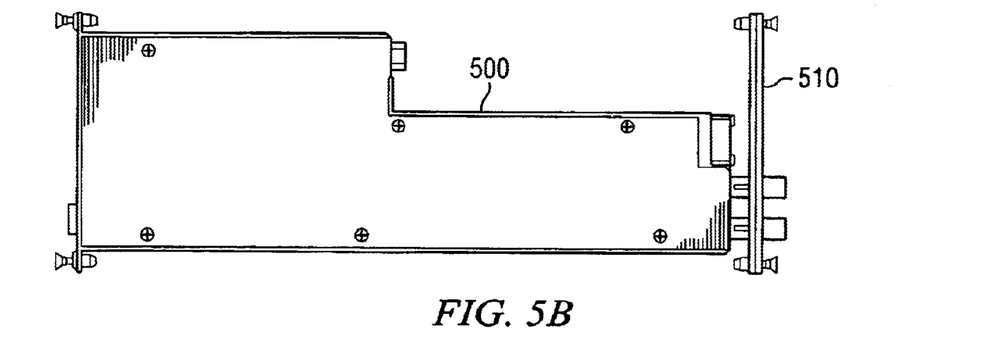
Figure 5C:
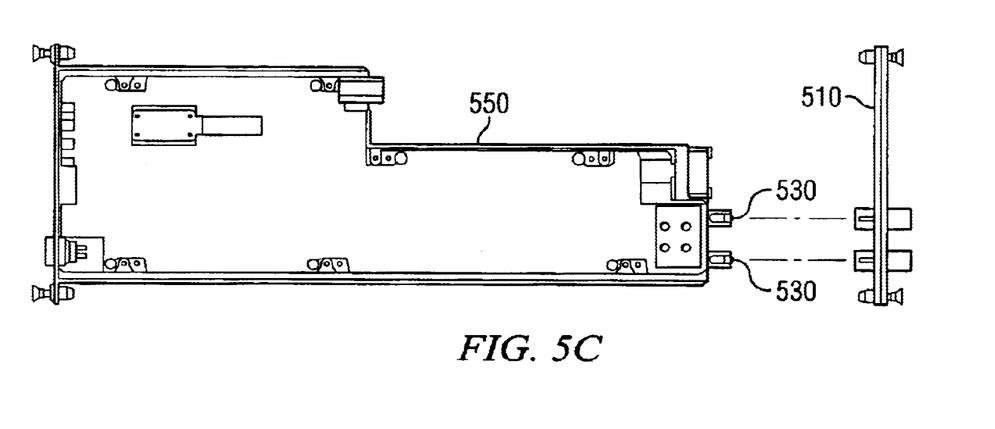
Figure 5D:
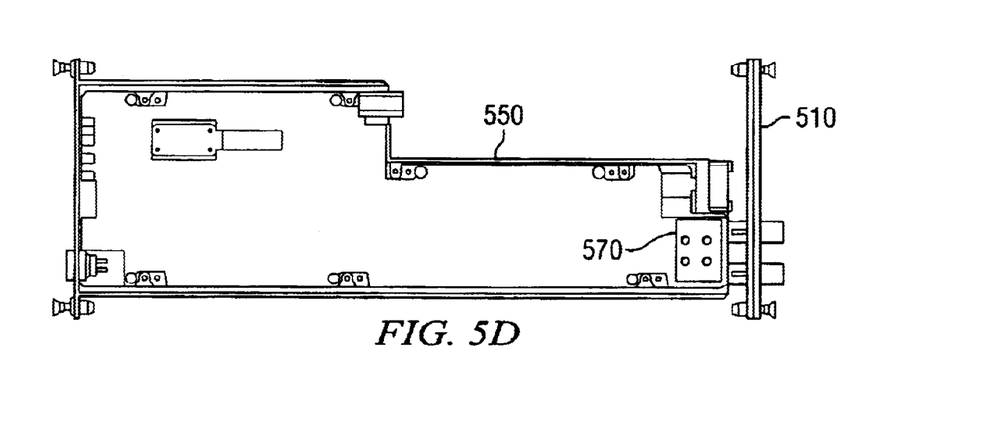
Figures 5E, 5F, 5G:
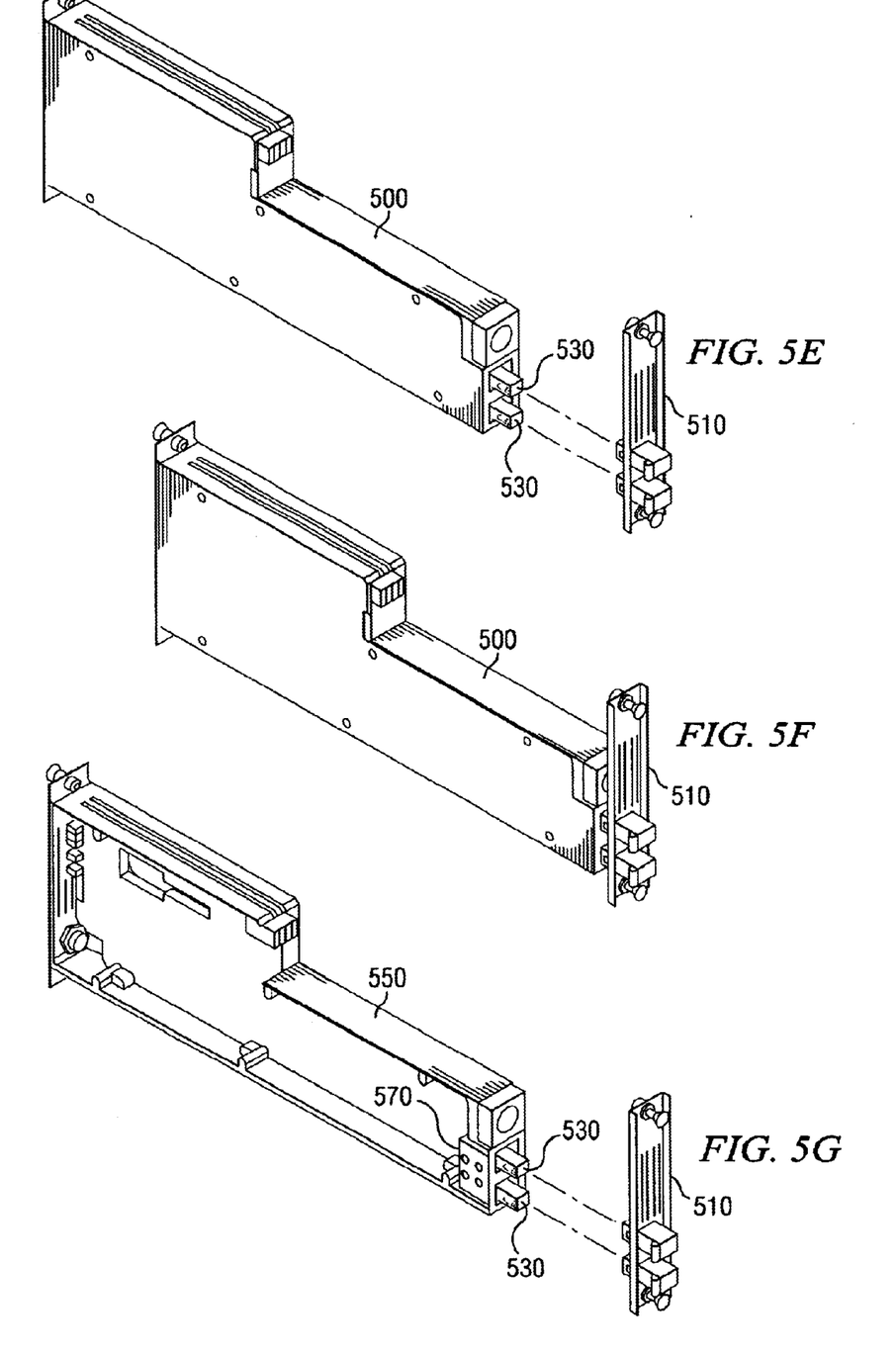
Figure 5H:
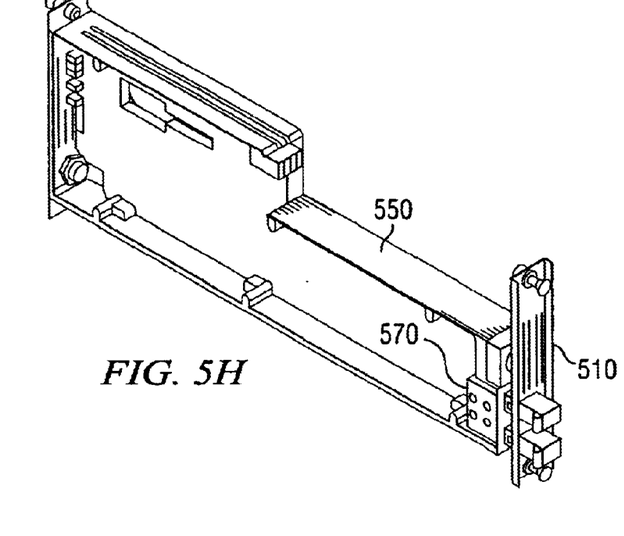

Referring to FIGS. 3A–3B, a process of assembling/disassembling a single port connector mounting assembly 300 is depicted. An optical connector 320 can be inserted (slide) into a one-port mounting 340 via a compressive connector bracket 330. A connector assembly alignment and stress-relief conduit 350 can hold a corresponding connector feed assembly.(not shown in FIGS. 3A–3B). A transversal slot 350 can be used to grip the connector feed assembly by the moutning 340. Of course, other channel shapes can be utilized other than the specific connector feed assembly and stress-relief conduit shown in FIGS. 1–3.

In more detail, a method can include penetrating a volume defined by the connector feed assembly pass-through slot with the connector at an angle to a principle plane defined by the connector mounting and then rotating a proximal end of the connector toward the principle plane. If the pass-trough slot and the connector are provided with complimentary engaging transverse surfaces, this method can be used to complete a connection that can be highly resistant to being pulled apart.

Referring to FIGS. 4A–4D and 4E–4H, orthogonal and perspective views of a process of assembling/disassembling a multi-port (multiple port) connector mounting assembly mounted to a module are depicted. A covered module assembly 400 includes a module 410, a connector termination 420 and a connector adapter 430. In FIGS. 4C, 4D, 4G and 4H, the module 410 is show without its cover, thereby exposing a seven-port connector mounting 470.

Referring to FIGS. 4A–4H, the connector adapter 430 can be manually removed, exposing the connector termination 420. The connector adapter 430 can be attached to a face plate of the module 400 with a screw. Of course, the invention is not limited to the use of screws. The module 400 can be panel mounted with adapter screws 410. An advantage of the connector mounting is that fiber is not snagged during use, assembly or cleaning. Also, there is no need to allow for excess fiber in the module. In a preferred embodiment, the connector termination 420 includes a standard SC connector termination.

Still referring to FIGS. 4A–4H, a removal process for cleaning away (removing) an optical connector can include: (i) removing an adapter screw with a screwdriver; and (ii) removing an adapter so that a corresponding connector can be cleaned.

Referring to FIGS. 5A–5H, orthogonal and perspective views of a mating process utilizing a connector mounting are depicted. A covered module 500 can be coupled to an adapter panel 510. The adapter panel 510 in this embodiment includes two adapters. The same module in an uncovered configuration 550 is shown both coupled and de-coupled from the adapter panel 510. When decoupled, the configuration exposes a pair of connectors 530. When uncovered, the configuration exposes a two-port holder 570.

Still referring to FIGS. 5A–5H, this design can provide several advantages, including: (i) top down assembly, which can be defined as a situation where no opposite side access is required which is especially useful if a connector needs to be replaced; and (ii) the unit can accept any standard optical adapter, which can be defined as a situation where no special blind mate adapter is needed. In a preferred embodiment, the pairs of connectors 530 include pairs of standard SC optical connectors.

Figure 6A:
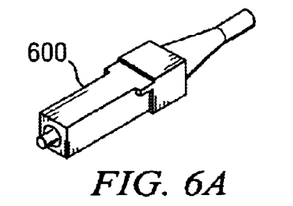
FIGS. 6A–6B illustrates perspective views of a connector and a connector holder, representing an embodiment of the invention.
Figure 6B:
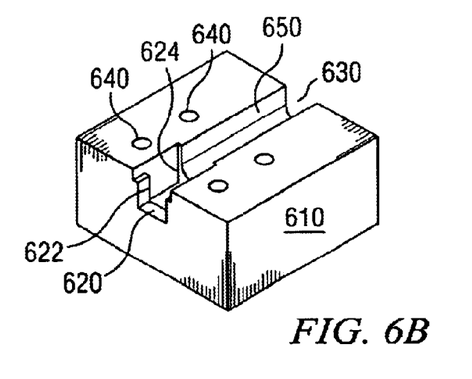

Referring to FIGS. 6A–6B, perspective views of a connector mounting 610 and a connector 600 are depicted. The connector mounting 610 can include a connector bracket portion 620 coupled to a connector feed assembly conduit portion 630. The connector bracket portion 620 can be a compressive connector bracket. The connector bracket portion can include a pass-through block surface 622 and a pull-out block surface 624. Together, surfaces 622 and 624 can cooperate to hold the connector 600 in an axially limited range of positions while still permitting the a pivoted removal of the connector 600. The connector mounting 610 can also include a set of coupling passages 640. The coupling passage 640 can facilitate the connection of the mounting 610 to a surface, for example, on a printed circuit board. The mounting 610 can include a connector feed assembly pass-through slot 650. The slot 650 can in-turn be coupled to a connector feed assembly alignment and stress-relief conduit 630. In a preferred embodiment, the connector bracket portion 620 and the connector feed assembly alignment and stress-relief conduit 630 can be shaped or molded to accommodate a standard LC optical connector.

Figure 6C:
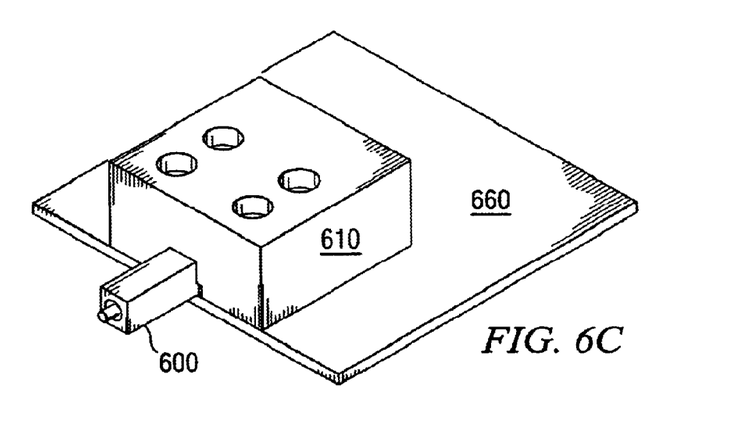
FIG. 6C illustrates a perspective view of an optical connector holder assembly, representing an embodiment of the invention.

Referring to FIG. 6C, a perspective view of the optical connector mounting assembly is depicted. The connector 600 is coupled to the connector mounting 610. The connector mounting 610 is coupled to a surface 660. In a preferred embodiment, the surface 660 includes a printed circuit board, or the like. A multi-port connector mounting can be termed an n-port mounting. Specific applications may require the use of an n-port mounting, where n is the number of connectors which can be assembled. An n-port mounting can include 2, 3, 4, 5, 6, 7, 8 or more ports.

Figure 7A:
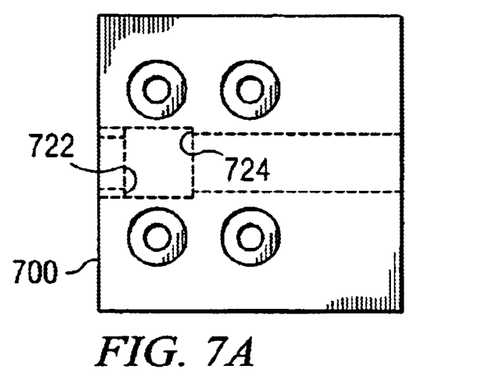
FIGS. 7A–7C illustrate orthogonal views of an optical connector holder, representing an embodiment of the invention.
Figure 7B:
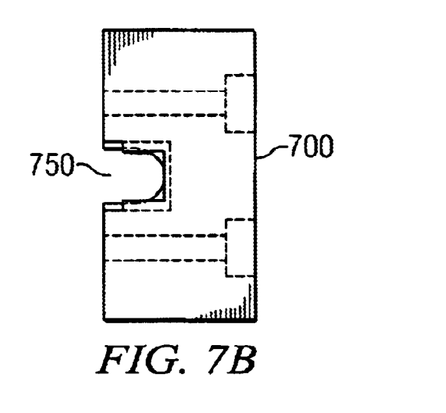
Figure 7C:
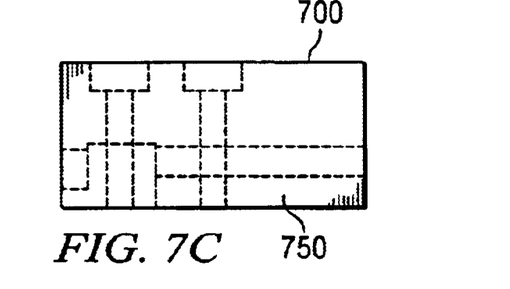

Referring to FIGS. 7A–7C, orthogonal views of a connector mounting 700 are depicted. FIG. 7A illustrates a top view of the connector mounting 700. The connector mounting 700 can include a pass-through block surface 722 and a pull-out block surface 724. Surfaces 722 and 724 can cooperate to hold a connector in an axially limited range of positions while still permitting a pivoted removal of the connector via a pass through slot 750. FIG. 7B illustrates a front view of the connector mounting 700. FIG. 7C illustrates a side view of the connector mounting 700.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The particular manufacturing process used for the connector mounting is not essential to the invention as long as it provides the connector mounting with described functionality. The connector mounting can be injection molded, machined from a solid or even cast. Of course, the invention is not limited to specific manufacturing techniques. Normally those who make or use the invention will select the manufacturing process based upon tooling and energy requirements, the expected application requirements of the final product, and the demands of the overall manufacturing process.

The particular material selected for the connector mounting is not essential to the invention, as long as it provides the described function. The connector mounting can be made of (co)polymer(s) such as high density polyethylene and/or metals such as aluminum. Of course, the invention is not limited to specific materials. Normally, those who make or use the invention will select the best commercially available material based upon the economics of cost and availability, the expected application requirements of the final product, and the demands of the overall manufacturing process.

The disclosed embodiments show a connector bracket and a channel which are shaped or molded to accommodate specific standard optical connector, but the connector bracket and the channel can be shaped or molded to accommodate other types of connectors, including, by way of example standard SC, FC, ST and LC optical connectors, electrical connectors and fluidic connectors. Fluidic connectors can be defined as connectors for the flow of gas, liquid and/or solid phase(s).

The disclosed embodiments show a coupling passage as the structure for utilizing a screw or other fastener to attach a connector mounting onto a surface, but the structure for attaching a connector mounting can be any other structure capable of performing the function of attaching, including, by way of example a bracket.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term deploying, as used herein, is defined as designing, building, shipping, installing and/or operating. The term means, as used herein, is defined as hardware, firmware and/or software for achieving a result.

Practical Applications of the Invention

A practical application of the invention that has value within the technological arts is optical connector mounting. Further, the invention is useful in conjunction with optical, electrical and/or fluidic connectors or in conjunction with optical, electrical and/or fluidic conductors, such as are used in optical networks, or the like. There are virtually innumerable uses for the invention, all of which need not be detailed here.

Advantages of the Invention

A connector mounting, representing an embodiment of the invention, can be cost effective and advantageous for at least the following reasons. The connector mounting provides for connector mounting onto a wide variety of surfaces, thereby accommodating a wide variety of connector manufacturer specifications in a multitude of situations. The connector mounting allows top-down assembly. The connector mounting significantly reduces fiber snagging during use, assembly and cleaning. The connector mounting obviates the need for excess fiber in the module. The connector mounting obviates the need for specialized connectors or adapters. The connector mounting can, if necessary, be shaped by hand (file) or machine (mill), optionally in-the-field at the point of installation, to accommodate connectors for which it was not originally designed. The connector mounting improves quality and/or reduces costs compared to previous approaches.

All the disclosed embodiments of the invention disclosed herein can be made and used without undue experimentation in light of the disclosure. The invention is not limited by theoretical statements recited herein. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, although the connector mounting described herein can be a separate module, it will be manifest that the connector mounting may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. An apparatus, comprising an optical or electrical connector mounting including:
    a compressive connector bracket having a first side wall and an opposing second side wall that is substantially parallel to the first side wall;
    a channel coupled to the compressive connector bracket, the channel defining i) a connector feed assembly alignment and stress relief conduit that extends along a length of the channel and ii) a connector feed assembly pass-through slot that extends along the length of the channel, is peripheral to, contiguous with and narrower than the connector feed assembly alignment and stress relief conduit and is substantially parallel to the first side wall; and
    a transversal slot extending from a first side surface to a second side surface,
    wherein a facet of the compressive connector bracket located between the first sidewall and the second side wall defines a diverging angle relative to the length of the channel.

2. The apparatus of claim 1, wherein a portion of the connector mounting is shaped to mate around an electrical connector form.

3. A multiple port connector mounting comprising the apparatus of claim 1.

4. The apparatus of claim 1, wherein the diverging angle is approximately 5°.

5. The apparatus of claim 1, wherein a portion of the connector mounting is shaped to mate around an optical connector form.

6. The apparatus of claim 5, wherein the optical connector form is an SC optical connector.

7. The apparatus of claim 5, wherein the optical connector form is an LC optical connector.

8. The apparatus of claim 1, further comprising a coupling passage extending across the connector mounting.

9. The apparatus of claim 8, wherein the coupling passage includes a threaded surface.

10. The apparatus of claim 8, further comprising another coupling passage extending across the connector mounting.

11. A method, comprising:
    providing an optical or electrical connector mounting with
        a compressive connector bracket having a first side wall and an opposing second side wall that is substantially parallel to the first side wall;
        a channel coupled to the compressive connector bracket, the channel defining i) a connector feed assembly alignment and stress relief conduit that extends along a length of the channel and ii) a connector feed assembly pass-through slot that extends along the length of the channel, is peripheral to, contiguous with and narrower than the connector feed assembly alignment and stress relief conduit and is substantially parallel to the first side wall; and
        a transversal slot extending from a first side surface to a second side surface, wherein a facet of the compressive connector bracket located between the first sidewall and the second side wall defines a diverging angle relative to the length of the channel;
    inserting a connector into the connector mounting via the compressive connector bracket; and
    resting a connector feed assembly in the channel,
    wherein resting the connector feed assembly in the channel includes resting the connector feed assembly in the channel via a connector feed assembly pass-through slot and
    wherein resting the connector feed assembly in the channel via a connector feed assembly pass-through slot includes penetrating a volume defined by the connector feed assembly pass-through slot with the connector at an angle to a principle plane defined by the connector mounting and then rotating a proximal end of the connector toward the principle plane and wherein a portion of the connector remains within a volume defined by the diverging angle.

12. The method of claim 11, wherein inserting the connector includes inserting an optical connector.

13. The method of claim 11, wherein inserting a connector includes inserting an electrical connector.

14. The method of claim 11, wherein providing the connector mounting includes providing a multiple port connector mounting.

15. The method of claim 11, further comprising attaching the connector mounting onto a surface.

16. The method of claim 15, wherein attaching the connector mounting onto the surface includes attaching the connector mounting onto a printed circuit board.

17. The method of claim 15, wherein attaching the connector mounting assembly onto the surface includes attaching the connector mounting assembly onto the surface utilizing a fastener.

* * * * *